United States Patent [19]
Ono

[11] 3,829,867
[45] Aug. 13, 1974

[54] CAMERA EQUIPPED WITH AN AUTOMATIC EXPOSURE CONTROL SYSTEM

[75] Inventor: Shigeo Ono, Yokohama, Japan

[73] Assignee: Nippon Kogaku K.K., Tokyo, Japan

[22] Filed: June 29, 1971

[21] Appl. No.: 157,943

[30] Foreign Application Priority Data
July 3, 1970  Japan.............................. 45/57742

[52] U.S. Cl........... 95/10 CE, 95/10 CT, 95/10 CD, 95/53 EB, 95/64 D
[51] Int. Cl. ............................................. G03b 7/08
[58] Field of Search......... 95/10 CE, 10 CT, 10 CD, 95/53 EB, 64 D

[56] References Cited
UNITED STATES PATENTS
3,554,104  1/1971  Winkler et al. .................... 95/10 CE

FOREIGN PATENTS OR APPLICATIONS
4,419,747  8/1969  Japan.............................. 95/10 CT

*Primary Examiner*—Samuel S. Matthews
*Attorney, Agent, or Firm*—Fitzpatrick, Cella, Harper & Scinto

[57] ABSTRACT

A camera having a taking lens with an adjustable aperture, shutter means mounted for movement from an initial position to a terminal position, and constructed and arranged that the time period between initiation and termination of movement is determinative of the exposure time of said camera, and an automatic exposure system including photosensitive means responsive to the light which is passed through the taking lens for providing a first electric signal relating to the brightness of the light, memory means coupled to the photosensitive means for memorizing the value of the brightness of the light passed through the taking lens after adjustment of the aperture, selectively actuable control means for adjusting the size of said aperture in response to the first electric signal and a predetermined exposure time of the camera, selectively actuable exposure means for adjusting the exposure time of said shutter means in response to the value of light memorized by the memory means, and switch means for selectively actuating either said control means for adjusting the size of said aperture or said control means for adjusting the exposure time of said shutter means.

24 Claims, 8 Drawing Figures

CAMERA EQUIPPED WITH AN AUTOMATIC EXPOSURE CONTROL SYSTEM

BACKGROUND OF THE INVENTION

1. Field of the Invention

This invention relates generally to a photographic camera, and more particularly to a photographic camera having an automatic exposure control system.

2. Description of the Prior Art

Various systems for automatically controlling the exposure of a photographic camera have heretofore been proposed and these systems may generally be grouped into the following three types:

i. A type of exposure control in which the f-value or size of aperture opening of the taking lens is automatically controlled in accordance with the brightness of the object being photographed, the sensitivity of the film employed in the camera, and the exposure time of the camera shutter;

ii. A type of exposure control in which the exposure time of the camera shutter is automatically controlled in accordance with the brightness of the object being photographed, the sensitivity of the film employed in the camera and the f-value of the taking lens; and iii. A type of exposure control in which a predetermined combination of f-value and shutter exposure time is automatically controlled in accordance with the brightness of the object being photographed and the sensitivity of the film used with the camera.

Although these systems have their own unique features and have been put into practice, they have certain disadvantages.

In automatic exposure systems of the type mentioned under item (i) above, the photographer can freely preselect any desired shutter speed. While this enables him to consider the movement of the object being photographed in such a manner, for example, that a higher shutter speed can be selected when the object is in faster motion, the photographer must follow the result derived from the f-value of the taking lens which is automatically determined by the system and thus can not consider adjustment for depth of field. However, when the object being photographed is stationary, adjustment for depth of field is the most critical factor and thus in this situation automatic exposure systems of the type (i) are unsatisfactory.

The automatic exposure systems of the type referred to under item (ii) above have features quite the reverse of those systems of type (i). That is, in systems of type (ii) the shutter speed can not be selected as desired by the photographer, and this drawback may result in an undesirable long exposure time when photographing objects in fast motion.

In the automatic exposure systems of the type (iii), identified above, both the f-value of the taking lens and the shutter speed are determined by the brightness of the object being photographed and as such, these exposure systems are of value only in elementary cameras, such as cameras for beginners.

In view of the fact that none of these prior automatic exposure systems can achieve satisfactory results for every type of photographic scene content, it is an object of the present invention to provide a control system which can either control the exposure time in response to the brightness of the object being photographed once the film sensitivity and f-value are preset in accordance with the type of the object or by the use of simple switching means can also control the f-value of the taking lens in response to the brightness of the object once the film sensitivity and exposure time are set.

SUMMARY OF THE INVENTION

According to the present invention, there is provided a camera having a taking lens with an adjustable aperture and an automatic exposure system for said camera including photosensitive means responsive to the light which is passed through said taking lens for providing a first electric signal related to the brightness of said light, aperture adjust means for adjusting the size of said aperture, selectively actuable automatic control means for controlling said aperture adjust means in response to said first electric signal and a predetermined photographic condition, such as shutter speed and film sensitivity, memory means coupled to said photosensitive means for memorizing the value of the brightness of the light passed through the taking lens after adjustment of said aperture, shutter means mounted for movement from an initial position to a terminal position, and constructed and arranged that the time period between initiation and termination of movement is determinative of the exposure time of said camera, release means for initiating movement of said shutter means from said initial position after adjustment of said aperture of the taking lens, timing circuit means for providing a second electric signal related to a time interval beginning with the initiation of movement of said shutter means from said initial position, and shutter speed control means responsive to said memory means and said second electrical signal of said timing circuit for adjusting the time period between initiation and termination of movement time of said camera is determined.

The above and other objects, features and advantages of the present invention will become more apparent from the following description of some embodiments thereof taken in conjunction with the accompanying drawings.

DESCRIPTION OF THE PREFERRED EMBODIMENTS

Description will first be made of the camera embodiment shown in FIGS. 1 through 6.

Wind and Release Mechanism

Figure 1:
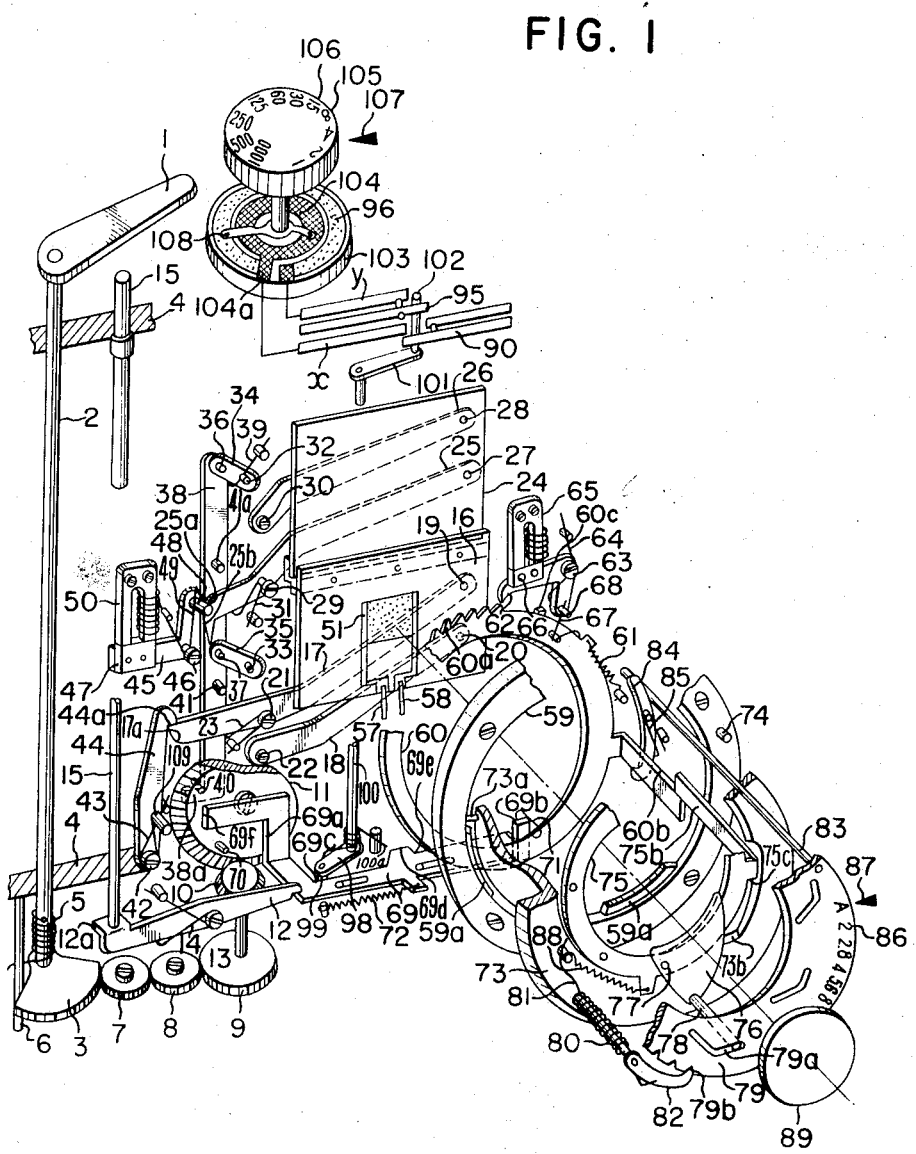
FIG. 1 is a schematic, partly broken-away, perspective view of a camera embodying an exposure control system according to the present invention.

As shown in FIG. 1, a wind lever 1 is fixed to a shaft 2 at one end thereof and interconnected with a sector gear 3 secured to the other end of the shaft 2. The shaft 2 is journalled to a camera body 4 for rotation with the wind lever 1. These members are normally biased by a spring 5 for clockwise rotation within a limit controlled by a pin 6. The rotation of the sector gear 3 is transmitted through idle gears 7 and 8 to a gear 9, and further through a bevel gear 10 integral with the gear 9 to a bevel gear 11.

A release lever 12 is pivotally mounted on a shaft 13 and normally biased for clockwise rotation by a spring 14. A release rod 15 journalled to the body 4 engages one end 12a of the release lever 12 to limit the clockwise rotation of the lever 12.

Shutter Mechanism

Figure 2:
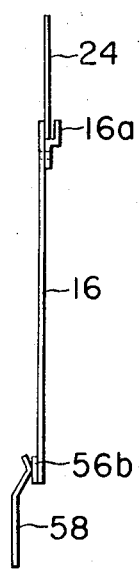
FIG. 2 is a side view of the shutter vanes employed in the camera shown in FIG. 1.

Levers 17 and 18 are pivotally connected to a first vane 16 by means of pins 19 and 20 on the one hand, and pivotally connected to the body 4 by shafts 21 and 22 on the other hand. Thus, the first vane 16, levers 17, 18 and body 4 constitute a four-articulation linkage, which is generally biased for clockwise rotation by a spring 23. Similarly, levers 25 and 26 are pivotally connected to a second vane 24 by means of pins 27 and 28 on the one hand, and pivotally connected to the body 4 by means of shafts 29 and 30 on the other hand. The second vane 24, levers 25, 26 and body 4 constitute another four-articulation linkage, which is generally biased for clockwise rotation by a spring 31. Both the first and the second vanes are adapted to move just in front of a camera film exposure opening (not shown). Levers 34 and 35 are pivotally connected to the body 4 by means of shafts 32 and 33 on the one hand, and also pivotally connected to a lever 38 by means of pins 36 and 37 on the other hand. These levers 34, 35, 38 together with the body 4 constitute a four-articulation linkage, which is generally biased for clockwise rotation by a spring 39. One end 38a of the lever 38 is engaged with a pin 40 studded on the bevel gear 11 so that counter-clockwise rotation of the bevel gear 11 moves the lever 38 downwardly and thereby pins 41 and 41a studded on the lever 38 force the levers 17 and 25 to rotate counterclockwise so as to bring the shutter into a tight or completely biased position. At the end of this process, a shutter release lever 44 pivoted to the body 4 at 42 and normally biased clockwise by a spring 43 is raised by one end 17a of the lever 17 against the force of the spring 43, until the end 17a of the lever 17 is retained by the hook portion 44a of the lever 44. A bell crank lever 45 for blocking the movement of the second vane for a certain time is pivoted to the body 4 at 46. The bell crank lever 45 has an armature 47 integrally formed at one end thereof and a pin 48 studded at the other end for engagement with a ramp 25a on the lever 25. A spring 49 is provided to normally urge the armature 47 against an electromagnet 50 fixed to the body 4. At the end of the shutter tightening or biasing process, a ramp 25b raises the pins 48 to stop at the position shown in FIG. 1. In the tight or completely biased position of the shutter, the second vane 24 maintains its position with the aid of the bearing portion 16a of the first vane 16, as best shown in FIG. 2.

Figure 3:
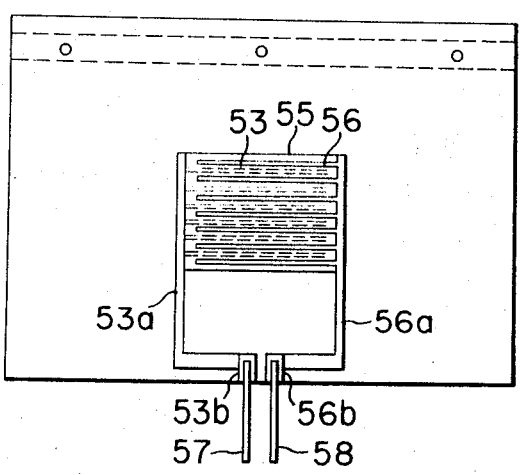
FIG. 3 is a front view of the shutter vanes of FIG. 2 and shows a photosensitive cell of the control system mounted thereon.
Figure 4:
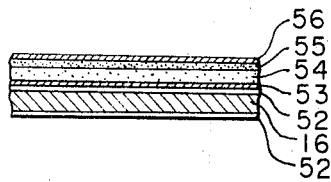
FIG. 4 is an enlarged cross-sectional view of the photosensitive cell shown in FIG. 3.

As shown in FIGS. 1 and 3, a photosensitive cell 51 is integrally attached to one surface of the first vane 16 to receive the light passed through the taking lens from an object to be photographed. The cell 51 may be, for example, of the construction shown in FIGS. 3 and 4. Thus, the first vane 16 can be formed of a thin titanium sheet whose opposite surfaces are coated with black melamine layers 52. As shown in FIG. 4 on one of these surfaces there is superposed an electrode 53 which is covered with an evaporated layer 54 of cadmium sulfide (CdS). A part of the CdS layer 54 is converted into copper sulfide by chemical reaction, and an electrode 56 is superposed on such part. Thus a thin, photosensitive cell is provided on the first vane 16 having fast photoresponsiveness and a photoelectromotive characteristic. The electrodes 53 and 56 are connected to contacts 53b and 56b through leads-out 53a and 56a, respectively, and in the tight or completely biased position of the first vane, these electrodes are electrically connected to contact leads 57 and 58 of an electronic control circuit (see FIG. 5). A silicon photocell may also be used as the photosensitive cell 51.

Aperture Control Mechanism

As shown in FIG. 1, a lens mount 59 for mounting an interchangeable taking lens for the camera is fixedly provided on the camera body 4, and a control ring 60 for controlling the aperture of the taking lens is rotatably mounted in concentric relationship with the lens mount 59. The control ring 60 is normally biased for clockwise rotation by a spring 61, and has a ratchet 60a formed partly around the outer circumference thereof. A ratchet pawl 62 cooperable with the ratchet 60a is pivoted to the body 4 at 63 and biased counter-clockwise by a spring 64. An armature 66 cooperable with an electromagnet 65 is attached to the ratchet pawl 62 at a portion thereof. When the control ring 60 is in tight or completely biased position, as shown in FIG. 1, a spring 67 provided on the ring 60 is engaged with a pin 68 studded on the pawl 62 to urge the armature 66 against the electromagnet 65.

A slide plate 69 is slidably mounted on to the camera body 4 and has an upright portion 69a, which is adapted to be pushed by a pin 70 on the bevel gear 11 upon counter-clockwise rotation of the gear 11 so that the slide plate 69 is moved rightwardly (as viewed in FIG. 1) until another upright portion 69b of the slide plate 69 strikes a pin 71 on the control ring 60 to tighten or bias the ring 60. At the end of the tightening process, the slide plate 69 is retained by the release lever 12. A spring 72 is provided to bias the slide plate 69 for leftward movement (as viewed in FIG. 1).

Taking Lens

Referring still to FIG. 1, in order to mount a taking lens to the camera body, which is preferably interchangeable, a lens tube 73 having a bayonet pawl 73a is fitted to the lens mount 59 on the camera body with the bayonet pawl 73a registered with the pawl 59a of the lens mount, whereafter the lens tube 73 is rotated clockwise. The lens mount 59 is provided with a pin 74 which is displaceable in the direction parallel with the optic axis of the lens. When mounting the taking lens to the camera body, the pin 74 is received in a groove (not shown) formed in a part of the lens tube 73, to thereby assist in determining the position of the lens tube about the optic axis. Within the lens tube 73, a stop ring 75 and a plurality of stop vanes 76 (only one of which is shown) are disposed for rotation about the optic axis. Each stop vane 76 has two studded pins 77 and 78, pin 77 being received into a hole formed in the stop ring 75 and pin 78 being received into a cam groove 79a formed in an aperture adjust ring 79. The aperture adjust ring 79 is formed with a clock groove 79b defined therein. A pawl 82 is pivoted to the lens tube 73 at 80 and urged against the aperture adjust ring 79 by a spring 81. The click groove 79b and the pawl 82 cooperate together to control the adjust ring 79. FIG. 1 shows a set position where the aperture is automatically controlled as the function of brightness of the object being photographed, and in this position a pin 83 studded on the aperture adjust ring 79 strikes one end of a key lever 84 pivotally mounted on the body 4 and forces this lever to rotate slightly counter-clockwise against the force of a spring 85. In this case, the diameter of the aperture of the lens is determined by the amount of rotation of the stop ring 75 after the camera has been actuated by operation of the release arm 15. Alternatively, if the aperture adjust ring 79 is rotated counter-clockwise to set an aperture scale 86 to a reference mark 87 provided on the body tube (not shown), the pin 83 will be disengaged from the key lever 84 and allow the latter to retain the projected portion 60b of the control ring 60 and prevent any further rotation of the ring 60. In this case, the diameter of the aperture is determined by the amount of rotation of the cam groove 79a, that is, determined manually. However, the cam groove 79a is made partly concentric with the optic axis so that the diameter of the aperture may not vary for any rotation of the ring 79 within the range from division A to 2 on the scale 86. The stop ring 75 is normally biased clockwise by a spring 88. When a taking lens has been mounted on the camera, the projection 75b of the stop ring 75 engages the projection 60b of the aperture control ring 60 and assumes the set position shown in FIG. 1. If the lens has been mounted on the camera with the shutter not tightened, the shutter should first be tightened and then the set position shown in FIG. 1 is attained.

Although lens 89 is actually fixed within the lens tube, it is illustrated separately in FIG. 1 for simplification.

Control Circuit

Figure 5:
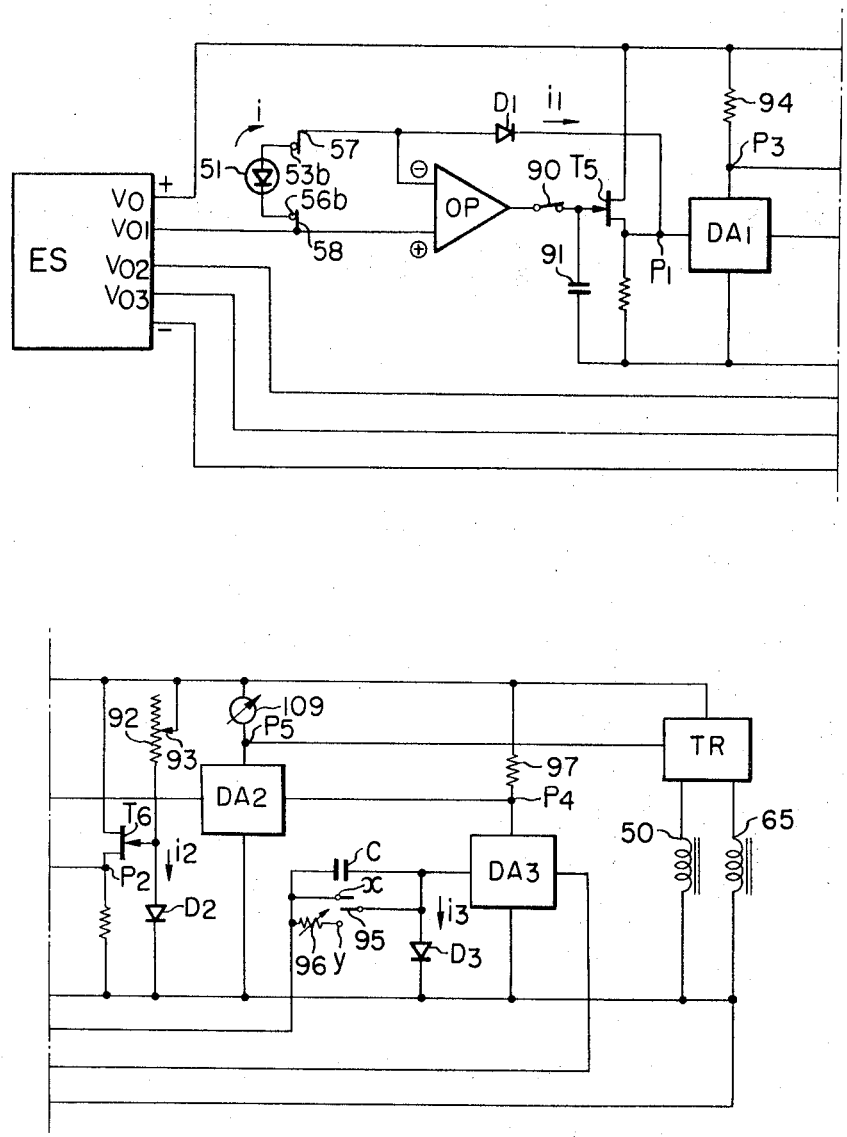
FIG. 5 is a schematic diagram of an electronic circuit employed with the control system of FIG. 1.
Figure 6:
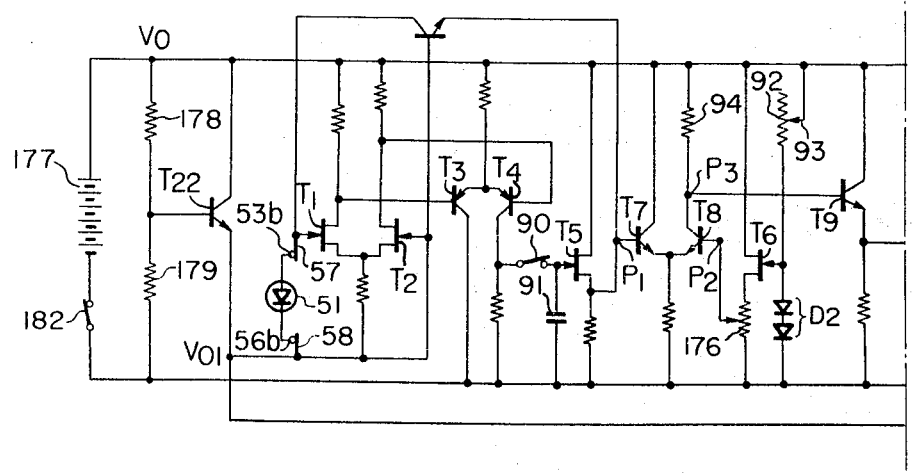
FIG. 6 is a schematic diagram of a specific circuit arrangement employed in the implementation of the electronic circuit shown in FIG. 5.
Figure 6:
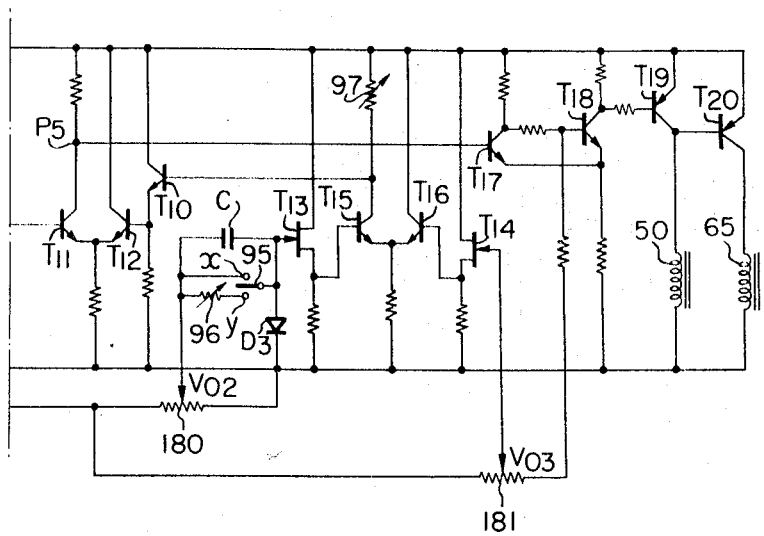

In the camera of the present invention, the control of the aperture size or f-value and the control of the shutter speed are effected electromagnetically by the electronic circuit shown in FIGS. 5 and 6. Since the photosensitive element 51 is provided on the first vane 16 of the shutter to generate a photocurrent in accordance with the intensity of the light passed through the taking lens of the camera, such photocurrent will disappear immediately upon the actuation of the camera shutter. Accordingly in order to control the shutter speed by the use of such photocurrent, it is necessary to memorize or store, for example on a capacitor, the value of this photocurrent before the operation of the shutter.

For this purpose, the control circuit according to the present invention is arranged such that the variation of a voltage stored in a memory capacitor is proportional to the logarithm of the variation in the intensity of light passed through the taking lens. Furthermore, the control circuit includes a charging or timing circuit in which the logarithm of its charging time is proportional to a charging voltage, a comparator circuit for comparing the voltage stored in the memory capacitor and the charging voltage of the charging circuit, and a trigger circuit adapted to control the electromagnets 50 and 65 in response to the output from the comparator circuit. When the difference between the voltage stored in the memory circuit and the voltage in the charging circuit reaches a predetermined value, the trigger circuit is operable to operate the electromagnet 50 and control the shutter electromagnetically.

The principle of the control circuit according to the present invention is illustrated in FIG. 5. As shown therein, the photosensitive cell mounted on the first vane 16 of the shutter (FIG. 1), is connected with the positive and negative inputs of an operational amplifier OP which has its output connected to the gate of a field effect transistor T5 through a switch 90. A capacitor 91 is inserted between that connection point and the negative terminal of a power source ES. The field effect transistor T5 is connected as a source follower, and between the output P1 thereof and the negative terminal of the operational amplifier OP there is provided a logarithm converting diode D1 forming a negative feedback circuit. When the current gain of the operational amplifier OP is sufficiently great, substantially all of the photocurrent generated by the photosensitive cell 51 in proportion to the incident light flows into the diode D1.

The terminal or anode voltage $v_1$ and the current $i_1$ of the diode D1 have the following relationship:

$$v_1 = h \log (i_1/I_o) \quad (1),$$

where $h = kt_1/q$ $k$ is Boltzmann's constant, $t$ is absolute temperature, $q$ is electronic charge, and $I_o$ is the reverse saturation current of the diode D1.

On the other hand, the current $i$ generated in the photosensitive cell 51 in response to the brightness $L$ of the light thereon has the following relationship:

$$i = a_1 L \quad (2)$$

where $a_1$ is a proportion constant.

For the reason set forth above, $i = i_1$, hence, $$v_1 = h \log (a_1 L/I_o) \quad (3).$$

Since the capacitor 91 is charged to a voltage which is lower than the voltage $v_{P1}$ at point $P1$ because of the gate-source voltage determined by the characteristic of the field effect transistor T5, after the switch 90 is opened as described hereinafter, the voltage $v_{P1}$ at point $P1$ is maintained at a value obtained by subtracting $v_1$ from the voltage $V_{01}$ at the positive terminal of the operational amplifier $OP$, as follows:

$$v_{P1} = V_{01} - h \log (a_1 L/I_o) \quad (4).$$

The film sensitivity is usually represented by a geometrical progression such as 25, 50, 100, 200, 400 etc. and in the present invention, film sensitivity control is obtained by arranging these numbers at equal intervals on a scale (not shown). In response to the manual setting of the film sensitivity to such equally spaced divisions, a resistor 92 has its resistance value varied. Specifically, as shown in FIG. 5, a tap 93 slides to vary the conductance of the resistor 92 in the form of the geometrical progression, i.e., in proportion to the film sensitivity. Thus, $$1/R = a_2 S \quad (5),$$

where $R$ is the resistance value of the resistor 92, $a_2$ is a proportion constant, and $S$ is the film sensitivity.

The current $i_2$ flowing through the resistor 92 is expressed as:

$$i_2 = a_2 V_{os} \quad (6),$$

where $V_0$ is the source voltage.

As shown in FIG. 5, a diode D2 is connected in series with the resistor 92 so that the terminal or anode voltage of the diode D2 is applied to the gate of a field effect transistor T6 which forms a source follower. For the same reasoning discussed above in connection with the equation (1) and further in view of equation (6), the voltage $v_2$ at the terminal or anode of diode D2 has the following relationship:

$$v_2 = h \log (i_2/I_0) = h \log (a_2 v_0/I_0) S \quad (7).$$

Accordingly, the voltage $v_{P2}$ at the output point P2 of the field effect transistor T6 is:

$$v_{P2} = h \log (a_2 v_0/I_0) S + v_{GS} \quad (8),$$

where $V_{GS}$ is the gate-source voltage of the field effect transistor T6.

The voltages at points P1 and P2 are applied to the two input terminals of a differential amplifier DA1, the output of which becomes the voltage drop at a resistor 94, i.e., voltage $v_{P3}$ at point P3, and this output voltage is applied to one of the two input terminals of differential amplifier DA2. From the nature of the differential amplifier, the following relation is derived:

$$\Delta v_{P3} = a_3(\Delta v_{P2} - \Delta v_{P1}) \quad (9),$$

where $\Delta v_{P1}$, $\Delta v_{P2}$ and $\Delta v_{P3}$ are the signal components of the voltages $v_{P1}$, $v_{P2}$ and $v_{P3}$, respectively, and $a_3$ is a proportion constant.

From equations (4) and (8), $v_{P1}$ and $v_{P2}$ are given as follows:

$$\Delta v_{P1} = - h \log L \quad (10),$$

and $$\Delta v_{P2} = h \log S \quad (11).$$

$$\Delta V_{P3} = a_3 h \log SL \quad (12).$$

As shown in FIG. 5, a voltage variable in proportion to the logarithm of a charging time (described more fully hereinafter) is applied to the other of the two inputs of the differential amplifier DA2.

In order to generate a voltage in proportion to the logarithm of such charging time, a capacitor C and a diode D3 are connected in series with the terminal $V_{02}$ of the power source ES. Parallel-connected with the capacitor C is a switch 95, which when closed at contact $x$ maintains the capacitor C in short-circuited condition, but which is adapted to assume the open position shown in FIG. 5 in response to the movement of the first shutter vane 16 so as to start the charging of the capacitor C. When the switch 95 is closed at contact $y$, a resistor 96 having a variable resistance value is parallel-connected with the capacitor C. The function of the resistor 96 will be described later.

When the capacitor C is charged through the diode D3, the terminal voltage of the diode D3 is varied with time. This relationship can be given in the manner described hereunder.

The relationship between the charging current and voltage of the capacitor is:

$$i_3 = C (dv_c/dt) \quad (13),$$

where $_3$ is the charging current of the capacitor $C$, $C$ is the capacity of the capacitor, $v_c$ is the terminal voltage of the capacitor, and $t$ is the charging time.

Since the charging current $t_3$ also flows into the diode D3, $$v_3 = h \log (i_3/I_0) \quad (14),$$

where $v_3$ is the terminal voltage of the diode D3, and $h$ and $I_0$ are constants (see equation (1)).

From equations (13) and (14), the following relationships are obtained:

$$V_{02} = v_c + v_3 \quad (15),$$

$$= v_c = h \log (C/I_0 \; dv_c/dt) \quad (16),$$

$$dt = (C/I_0) (Vc - V_{o2}/h) dVc \quad (17),$$

$$t = (C/I_0) \exp (v_{o2}/h) \int \exp(vc/h) dVc \quad (18),$$

$$= (Ch/I_0) \exp (v_c - V_{02}/h) + A \quad (19).$$

When $t = 0$, $v_c = 0$. Hence, $$A = (- Ch/I_0) \exp (V_{o2}/h) \quad (20).$$

Therefore, $$t = (Ch/I_0)\exp (-V_{o2}/h) \{ \exp (Vc/h) - 1\} \quad (21),$$

$$Vc \approx h \log (I_0 t/ch) + V_{02} \quad (22).$$

Hence, the relationship between the charging time and the terminal voltage of the diode D3 is:

$$v_3 = V_{02} - v_c = h \log (Ch/I_0) - h \log t \quad (23).$$

This means that there is obtained a voltage proportional to the logarithm of the charging time. Such voltage is not applied directly to the input of a second differential amplifier DA2 but to one input terminal of a third differential amplifier DA3. A reference voltage $V_{03}$ is applied to the other input of the third differential amplifier, and an output derived as a voltage drop in the output resistor 97 is applied to the input of the second differential amplifier DA2. The reference voltage $V_{03}$ is useful to adjust the two input levels of the second differential voltage DA2. Therefore, the signal component $\Delta v_{P4}$ of the voltage at point P4 is expressed as:

$$\Delta V_p 4 = -a_4 h \log t \quad (24),$$

and the signal component $\Delta v_{P5}$ of the output voltage at the output point P5 of the second differential amplifier DA2 is expressed as:

$$\Delta v_{P5} = a_5 (\Delta v_{P3} - \Delta v_{P4}) = a_5 h (a_3 \log SL + a_4 \log t) \quad (25).$$

By selecting the circuit constant so as to provide the relation that $a_3 = a_4$ (for example, suitably selecting the resistance value of the output resistor 97), it follows:

$$\Delta v_{P5} = a_3 a_5 h \log SLt \quad (26).$$

Accordingly by arranging the second vane 24 of the shutter so as to be triggered when $\Delta v_{P5}$ reaches a predetermined value, the following relation can be maintained:

$$SLt = \text{constant tm} \quad (27).$$

Since the photosensitive cell 51 is provided on the first vane 16, the brightness L of the cell 51 can be regarded as equal to the brightness at the image plane of the taking lens, and this fact includes the effect provided by the aperture of the taking lens. In order to electromagnetically control the shutter speed and the $f$-value of the taking lens so as to satisfy equation (27), there is provided in the control circuit shown in FIG. 5, a trigger circuit TR operable by the voltage from point P5. Electromagnets 50 and 65 are connected with the trigger circuit TR which is arranged to excite one of the electromagnets 50 and 65 while the other is not excited and vice versa.

SWITCHING MECHANISM

To open and close and change over the aforementioned switches 90 and 95, the slide plate 69 is formed with cam portions 69c, 69d and 69e, which may be engaged by a change-over lever 98 through a pin 99 studded thereon (see FIG. 1). A shaft 100 is pivotally mounted on the camera body and the lever 98 is fixed on one end of the shaft 100. A spring 100a is provied to urge the pin 99 against the cam portions. A change-over lever 101 fixed on the other end of the shaft 100 has a pin 102 of insulating material studded thereon for cooperation with the switches 90 and 95.

When the cam portion 69c moves the change-over lever 98, the switch 90 is closed and the switch 95 is closed at contact y; when the cam portion 69d moves the change-over lever 98, the switch 90 is opened and the switch 95 is closed at contact x; and when the cam portion 69e moves the change-over lever 98, the switch 90 remains open and the switch 95 is moved to the neutral position as shown in FIG. 5.

The resistor 96, mentioned previously, is disposed in an arcuate form on a circular base plate 103 of insulating material, one end of the resistor 96 being contiguous with a portion 104a of a conductor 104 disposed on the same base plate.

A shutter dial 105 is mounted for rotation relative to the base plate 103 and has a scale 106 provided thereon. When a desired division of the scale 106 is registered with a reference mark 107, a conductive brush 108 integral with the dial 105 will bridge a portion of the resistor 96 and the conductor 104 to thereby set a resistance value corresponding to the speed represented by the registered division of the scale 106.

General Operation

By rotating the wind lever 1 in the counter-clockwise direction, the bevel gear 11 is rotated counter-clockwise through gears 3, 7, 8, 9 and 10 so that pins 40 and 70 displace the lever 38 downward and the slide plate 69 rightwardly, respectively. The downward displacement of the lever 38 causes the first and second shutter vanes 16 and 24 to move upwardly until retained in the tight or completely biased position by the shutter release lever 44. On the other hand, the aperture control ring 60 and the stop ring 75 are forced to rotate counter-clockwise by the upright portion 69b of the slide plate 69 until retained in a tight or completely position by the release lever 12.

Automatic Shutter Speed Control with a Preset f-Value

The aperture adjust ring 79 is first rotated until a desired division of the f-number scale 86 is registered with the reference mark 87. Thereupon, the pin 83 is disengaged from the key lever 84, so that the lower end of the lever 84 engages the projection 60b to prevent clockwise rotations of the aperture control ring 60 and the stop ring 75. At the same time the stop vane 76 is forced into the cam groove 79a and rotated toward the optic axis. Thus, the lens aperture is reduced to a predetermined value. In this position the cam portion 69c moves the change-over lever 98 to close switch 90 and close switch 95 at contact y.

Subsequently, the release rod 15 is depressed to rotate the release lever 12 counter-clockwise, whereby the slide plate 69 is allowed to slide leftwardly due to the action of the spring 72. The cam portion 69d of the slide plate 69 then strikes the pin 99 to cause the change-over levers 98 and 101 to rotate clockwise, whereby the switch 90 is opened and the switch 95 is closed at contact x so as to allow the capacitor C to discharge. The pin 99 is then shifted to the cam portion 69e to maintain the switch 90 in open position while bringing the switch 95 into a neutral position where its movable contact is disengaged from either contact x or y. At the end of the stroke of the slide plate 69, the portion 69f thereof pushes the pin 109 on the shutter release lever 44 to move the first vane 16 to thereby expose the film.

Thus, the switch 90 is open so that the intensity f of light passed through the taking lens aperture, now set to a predetermined value, is memorized as a charge in the capacitor 91. Also, the switch 95 is engaged at point x to allow the capacitor C to discharge, whereafter it is disengaged from point x to a neutral position to allow the charging of the capacitor C, and nearly at the same time the first shutter vane 16 is released. The electromagnet 50 is then excited by the trigger circuit TR because the input to the differential amplifier DA3 is sufficiently high when the capacitor C has been discharged. As a result, the second vane 24 attempts to follow the movement of the first vane 16, but this is prevented by the pin 48 which now retains the ramp 25a of the lever 25. Also, the photosensitive cell 51 is disconnected from the control circuit of FIG. 5 upon movement of the first vane 16, so that control of the shutter speed is effected in accordance with the quantity of charge stored in the capacitor 91. As the charging of the capacitor C progresses, the input voltage of the differential amplifier DA3 is gradually decreased and the voltage at input point P4 of the differential amplifier DA2 is gradually increased, and when the difference between the voltage at input point P4 and the voltage at the other input point P3 determined by the intensity of light and film sensitivity reaches a predetermined value, thd trigger circuit TR is operated to deenergize the electromagnet 50, so that the lever 25 is allowed to rotate while raising the pin 48 by means of ramp 25a until the second vane closes the film exposure opening.

The time sequence described above takes place independently of the position at which the shutter dial is adjusted.

Automatic f-Value Control with a Preset Shutter Speed

The shutter dial 105 is first rotated to set the shutter speed to a desired value, whereafter the aperture adjust ring 79 is rotated until the letter A of the scale 86 is registered with the reference mark 87. Thereupon, the pin 83 is engaged with the key lever 84 to rotate it counterclockwise, whereby the stop ring 75 is freed from retention. The winding operation is effected in the described manner and upon engagement of the cam portion 69C with the pin 99, the swich 90 is closed while the switch 95 is engaged at contact y.

Before describing the circuit condition in this case, it is necessary to describe further the characteristic of the charging circuit provided by capacitor C and diode D3 together.

The output voltage of the charging cirucit, i.e., the terminal or anode voltage of the diode D3 is independent of the brightness of the object being photographed, and only dependent of time. In other words, the shutter speed and the terminal voltage of the diode D3 is directely correlated. Therefore, the resistance value of the resistor 96 is selected so that in the wound-up or biased condition the switch 95 is closed a point y and the terminal voltage of the diode D3 becomes a voltage corresponding to the set shutter speed in response to the shutter dial setting action. Accordingly, the voltage at one input P4 of the differential amplifier DA2 is also determined.

When the brightness on the photosensitive cell 51 is high, the voltage at input P3 of the differential amplifier DA2 is lowered to deenergize the electromagnet 50 and energize the electromagnet 65. When the release rod 15 is depressed with the camera looking toward the object being photographed, various parts move in the described sequence, that is, the slide plate 69 slides leftwardly, the aperture control ring 60 and stop ring 75 rotate clockwise, and the stop vane 76 is rotated toward the optic axis due to the cam groove 79a so as to gradually reduce the lens aperture. As a result, the brighness on the photosensitive cell 51 is decreased so that the voltage at input P3 of the differential amplifier DA2 is gradually increased until the difference thereof from the voltage at the other input P4 reaches a predetermined value, whereupon the electromagnet 50 is energized and the electromagnetic 65 is deenergized. The ratchet pawl 62 is now biased for counterClockwise rotation by the spring 64 because the rotation of the aperture control ring 60 has caused the projection 60c to engage the spring 67 and disengage it from the pin 68. Upon deenergization of the electromagnet 65, the ratchet pawl 62 is turned to mesh with the ratchet 60a and thereby prevents any further rotation of the rings 60 and 75, thus determining the diameter of the lens aperture. On the other hand, the slide plate 69 continues to slide leftwardly so that the cam portion 69d thereof raises the pin 99, and as described previously, the switch 90 is opened while the switch 95 is closed at contact x to cause the capacitor C to discharge. As a result, the intensity of light passed through the reduced lens aperture is memorized as a voltage in the capactor 91. The discharge of the capacitor C also causes a voltage drop at input P4 of the differential amplifier DA2, but the electromagnets 50 and 65 remain unchanged. Then the pin 99 moves down along the cam portion 69e, whereby the switch 95 is disengaged from contact x and moved to the neutral position shown in FIG. 5 to start charging the capacitor C and nearly at the same time the projection 69f of the slide plate 69 strikes the pin 109 to release the shutter and move the first vane. When the capacitor C is charged and the voltage in the diode D3 reaches a value determined by the resistor 96, that is, when a predetermined length of time has been passed, the electromagnet 50 is again deenergized to release the second vane to finish the exposure of the film.

When the object to be photographed is so dark that a proper exposure cannot be achieved even by fully opening the lens aperture, the birghtness of the photosensitive cell 51 is low and the electromagnet 65 is therefore in the deenergized state immediately at the tight or completely biased shutter position. Thus, when the release rod 15 is depressed, the ratchet pawl 62 immediately retains the ratchet 60a and the shutter is released with the lens aperture fully open. Thereafter, the shutter speed control is effected as described previously. However, even if the charging of the capacitor C progresses until the terminal voltage of the diode D3 is lowered to a level corresponding to the predetermined shutter speed, the difference between the two input voltages of the differential amplifier DA2 does not reach a predetermined value. Therefore, the capacitor C is allowed to continue charging, and only when said input difference reaches the predetermined vlue, the electromagnet 50 os deenergized to close the shutter.

Conversely, when the brightness of the object is too high, the electromagnet 65 remains energized, while the stop ring 75 is prevented from rotating to thereby stop down the lens aperture to minimum aperture size because a portion 75c thereof is retained by stop 73b provided in the lens tube 73. In this case the voltage at input P3 of the differential amplifier DA2 is stored at a level lower than expected. Next, the switch 95 contacts with the point x to allow the capacitor C to discharge. Sequentially the switch 95 is moved from the piont x to the neutral position and almost simultaneously the shutter is released. Thus, the capacitor C starts to be charged and the voltage at the other input P4 begins to increase so that the difference between the two input voltages of the differential amplifier DA2 reaches a predetermined value earlier than a predetermined exposure time and the electromagnet is again de-energized to close the shutter.

In summary, when the brightness of the object to be photographed is within a range which allows a proper exposure to be achieved by controlling the aperture with respect to a preset shutter speed, the aperture is first reduced to a proper value and then the shutter is operated at the preset speed.

When the brightness of the object is too low, the lens aperture is maintained fully open and the shutter speed is automatically made lower than a preset value to thereby achieve a proper exposure.

When the brightness of the object is too high, the lens aperture is reduced to a minimum value and the shutter speed is automatically made higher than a preset value to thereby achieve a proper exposure.

In this way, the range of brightness available for automatic control is greatly increased.

Indication of Automatically Controlled f-Value or Exposure Time

If the f-value resulting from the automatic aperture control using a preset shutter speed could be indicated, it provides a great convenience for photogrpahers. To that end, an indicator 109 is provided in the output circuit of the differential amplifier DA2. For the automatic shutter speed control using a preset f-value, the same indicator 109 may also be used to indicate the shutter speed by setting the resistor 96 to a predetermined resistance value.

Circuit Arrangement

An example of the circuit arrangement shown in FIG. 6 will not be described in contrast with FIG. 5 which illustates the principle of such circuit.

In FIG. 6, field effect transistors T1, T2 and trnsistors R3, T4, constitute a unit corresponding to the operational amplifier OP of FIG. 5. Field effect transistors T5 and T6 are identical with those designated by similar characters in FIG. 5. Transistors T7 and T8 correspond to the first differential amplifier DA1 of FIG. 5, transistors T9, T10, T11 and T12 correspond to the second differential amplifier DA2 of FIG. 5, field effect transistors T13, T14 and transistors T15, T16 correspond to the third differential amplifier DA3 of FIG. 5, transistors T17, T18, T19 and T20 correspond to the trigger circuit TR of FIG. 5 and transistor T21 corresponds to the logarithm converting diode D1 of FIG. 5.

Light impinging on the photosensitive cell 51 produces an electromotive force which causes the gate voltage of the field effect transistor T1 to become slightly higher than that of the field effect transistor T2, so that the drain voltage of the field effect transistor T1 falls and that of field effect transistor T2 rises. As a result, the collector current of the transistors T3 increases and the collector current of the transisotr T4 decreases. Therefore, the capacitor 91 discharges through the switch 90 to decrease the source voltage of the field effect transistor T5. However, most of the current produced in the photosensitive cell 51 flows into the transistor I21 for logarithm conversion, the base of which is grounded between the gate of the field effect transistor T1 and the source of the field effect transistor T5. In other words, transistor T21 forms a negative feedback circuit. It is well known that the characteristic of a feedback amplifier is the characteristic of a feedback circuit when the gain of the amplifier itself is sufficiently great. Since the logarithm of the collector-emitter current of the transistor T21 is proportional to the collector-emitter voltage of that transistor and, moreover, most of the current produced in the photosensitive cell 51 flows into this transistor T21, a voltage proportional to the current in the cell 51 or the logarithm of the brightness of the light on that cell appears at point P1. The gate-source voltage of the field effect transistor T5 is balanced in accordance with its operating curve and therefore, when the switch 90 is closed, the point P1 maintains a voltage proportional to the brightness then present on the photosensitive cell 51.

Variable resistor 92 and the diode D2 which together define the input circuit of the field effect transistor T6 have already been described and need not be explained further. For the source of field effect transistor T6, a potentiometer 176 is employed to adjust the rate of variation of the resistor 92 with respect to the sensitivity of the photosensitive cell 51. More specifically, the rate of variation of the resisor 92 is preset to a slightly greater value than that acutally required, and the output voltage of the field effect transistor T6 is divided by the potentiometer 176 so as to match the sensitivity of the photosensitive cell 51 and such divided voltage is applied as input to the first differential amplifier defined by transistor T7 and T8, whose output is derived as a voltage at point P3. As the brightness of the object becomes higher, the voltage at point P3 becomes lower.

The third differential amplifier is provided by drain-grounded field effect transistors T13, T14 and transistors T15, T16 and it receives, as its input, the terminal voltage of the diode D3 in the charging circuit provided by the capacitor C and the diode D3. The output of the third differential amplifier is taken out as the terminal voltage of the collector resistor 97 of transistor T15, i.e. as the voltage at point P4. This voltage rises with the charging time of the capacitor C. The resistor 97 is variable and useful to equalize the voltage variation at point P3 for twice as much brightness to the voltage variation at point P4 for twice as much time.

The second differential amplifier is defined by the differential amplifier transistors T11 and T12 whose operation is stabilized by emitter followers defined by transistors T9 and T10 provided at the preceding stage. The voltage difference between the points P3 and P4 is amplified by the second differential amplifier and taken out as a voltage variation at point P5. The voltage at point P4 rises with time and the voltage at point P5 begins to rise sharply when the voltage at point P4 approaches the voltage at point P3.

The trigger circuit TR is defined by transistors T17, T18, T19 and T20. In this trigger circuit, a low voltage at point P5 turns off the transistors T17 and T20 and turns on the transistors T18 and T19. As described above, the voltage at point P5 goes up with time and, when it reaches a trigger voltage, the transistors T17 and T20 are turned on while transistors T18 and T19 are turned off. The sequence of energization and deenergization of electromagnets so and 65 related to the shutter speed control the aperture control respectively has been already described and is omitted herein.

A battery 177 and a transistor T22 together constitute a power supply circuit ES. Voltage $V_{01}$ is lower than the base voltage of transistor T22 by approximately 0.6 volt. The base voltage of T22 is determined by resistors 178 and 179. Voltages $V_{02}$ and $V_{03}$ are taken out as the tap voltages of potentiometers 180 and 181 respectively. Voltage $V_{02}$ is variable and is used to correct any irregularity of the capacity of the capacitor C. $V_{03}$ has been described previously. Switch 182 is a power switch.

Application to Single Lens Reflex Cameras

Figure 7:
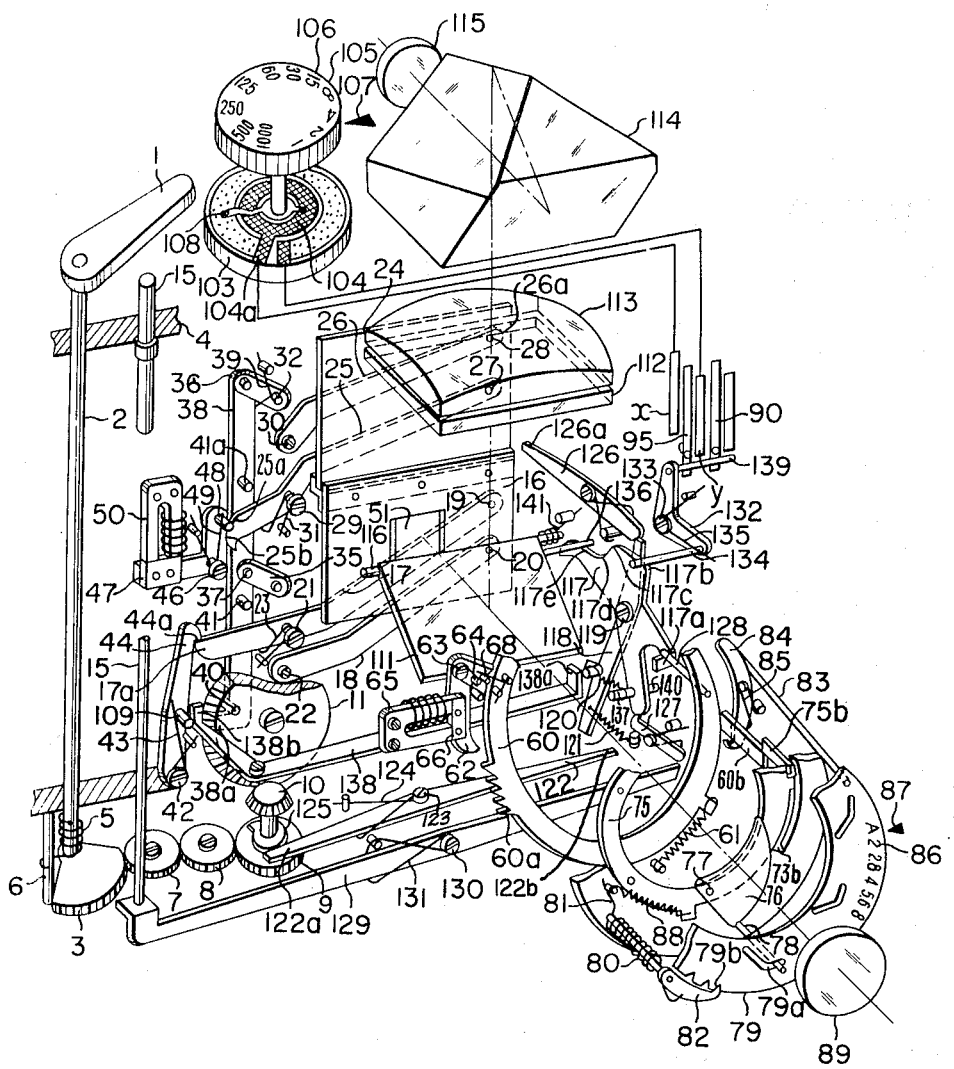
FIGS. 7 and 8 are schematic, partly broken-away, perspective views showing further emobidments of the present invention as applied to single lens reflex cameras.
Figure 8:
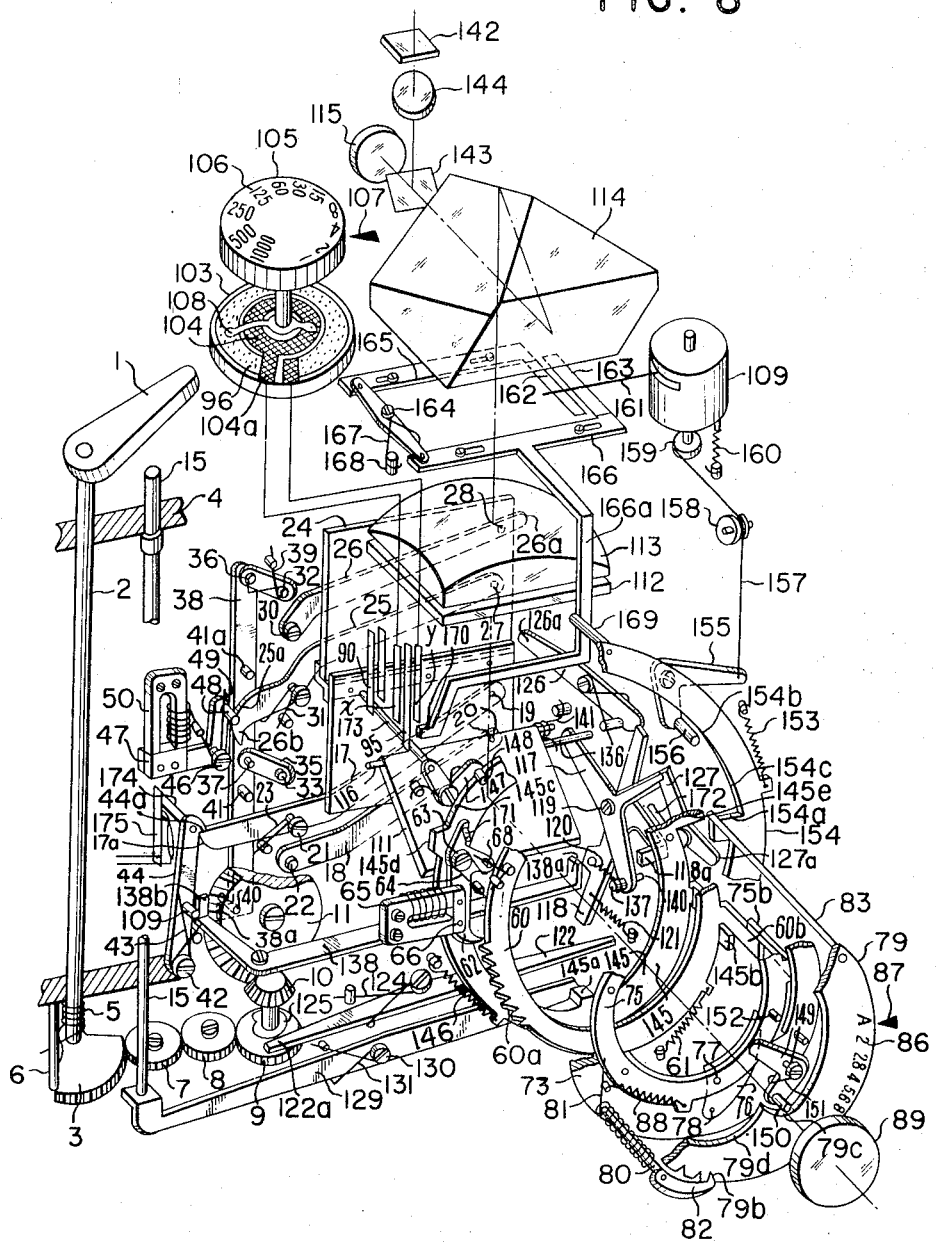

Application of the present invention to single lens reflex cameras may take the two alternative forms as shown in FIGS. 7 and 8.

Referring first to the embodiment of FIG. 7 wherein like numerals used in FIG. 1 are also used to denote similar structure and function, it will be seen that the lens mount 59 shown in FIG. 1 is omitted from FIG. 7 for simplicity. Light passed through the taking lens 89 is reflected from a mirror 111 toward a focusing plate 112. The light is then condensed by a condenser lens 113 and directed through a pentaprism 114 so as to pass through an eyepiece 115 to the eye of a viewer or photographer. The mirror 111 is mounted on the camera body for rotation about a shaft 116. A mirror kick-up lever 117 is pivotally mounted on the body by means of a shaft 119 in common with a mirror return lever 118. A spring 120 is extended bdtween and secured to these two levers 117 and 118. The return lever 118 is biased for counter-clockwise rotation by the action of another spring 121. A lever 122 for charging the springs 120 and 121 is mounted for rotation about a shaft 123 and has one end 122a urged by a spring 124 so as to bear against a cam 125 formed integrally with gear 9. The other end 122b of the lever 122 is engageable with one end of the return lever 118 to turn this lever clockwise until retained by a key lever 126, when the cam 125 is rotated clockwise. The mirror kick-up lever 117 is normally retained by the key lever 127. The mirror kick-up lever 117 is constructed so that in its normal position the arm 117a thereof is engaged with a pin 128 on the control ring 60 to rotate rings 60 and 75 counter-clockwise so as to keep the lens aperture fully open. A lever 129 for releasing the mirror kick-up lever 117 is pivoted to the body at 130 and biased for clockwise rotation by a spring 131.

A lever 132 is pivoted to the body at 133 so as to change over switches 90 and 95 in response to the mirror kick-up lever 117, and the lever 132 is provided with a pin 134 which is urged by a spring 135 so as to cooperate with cam portions 117b, 117c and 117d formed in the lever 117. When the wind lever 1 is rotated counter-clockwise, the shutter moves in the sequence described above and the mirror driving mechanism drives the mirror return lever 118 clockwise through lever 122 until the lever 118 is retained by the key lever 126. In this process the springs 120 and 121 are tensioned as shown in FIG. 7.

When the releae rod 15 is depressed, the levers 129 and 127 are both rotated counter-clockwise and the mirror kick-up lever 117 is rotated clockwise by the action of the spring 120 so that the arm 117e of the lever 117 pushes a pin 136 on the mirror 111 to kick-up the mirror 111. At the same time, the aperture control ring 60 and the stop ring 75 are both rotated clockwise, but the stop vane 76 remains fully open because the cam groove 79a is partly concentric with the optic axis. The cam portion 117e is formed so as to allow the lever 117 to continue rotating even if the mirror 111 is retracted out of the optical path of the photographing lens 89. The stop vane 76 is stopped down with the aid of the cam groove 79a. Accordingly, the brightness on the photosensitive cell 51 is gradually reduced to reach a predetermined brightness, where upon the electromagnet 65 loses its attraction to allow the pawl 62 to engage a tooth of the ratchet 60a so as to control the lens aperture. The lever 117 is further rotated so that a pin 137 pushes the projection 138a of shutter release lever 138 while another projection 138b pushes a pin 109 to rotate the lever 44 counter-clockwise, thus releasing the shutter. During this operation, the aperture control has been completed, whereupon the cam portion 117c raises the pin 134 to rotate the change-over lever 132 counter-clockwise so that pin 139 causes the switch 95 to change over from contact $y$ to contact $x$ while opening the switch 90 to memorize the brightness on the photosensitive cell 51 illuminated by the light passed through the stopped-down lens aperture. Thereafter, pin 134 slides down onto the cam portion 117d to disengage the switch 95 from contact $x$ while maintaining the switch 90 open, whereby the exposure time of the shutter is controlled in accordance with the value so memorized, in the same way described with respect to FIG. 1. At the end of the closing action of the second shutter vane 24, the end 26a of the lever 26 strikes the end 126a of the key lever 126 so that the lever 126 is rotated counter-clockwise, and the mirror return lever 118 is also rotated counter-clockwise by the action of spring 121. Lever 117 is also rotated counter-clockwise by engagement of the return lever 118 with a pin 140 provided on the lever 117, until the lever 117 is retained by key lever 127. Thereupon, the aperture control mechanism and the mirror 111 are returned to their respective positions as shown in FIG. 7, by the projection 117a of the lever 117 and by the spring 141, respectively.

Another form of the present invention as applied to single lens reflex cameras is shown in FIG. 8 wherein like numerals used in FIGS. 1 and 7 are also used to denote similar structure and function. This alternative form differs from the embodiment of FIG. 7 in that photosensitive cell 142 is arranged to respond to viewfinder light and therefore the mirror 111 is adapted to be kicked up after the aperture control operation is completed.

Light passed through the taking lens 89 is reflected by mirror 111 so as to pass through the focusing plate 112, the condenser lens 113 and the pentaprism 114 to a translucent mirror 143 provided between the eyepiece 115 and the prism 114. The mirror 143 partly reflects the light so as to pass through a condenser lens 114 to the photosensitive cell 142. The focusing plate 112 may comprise a Fresnel lens having a condensing characteristic, and the optical members 112, 113 and 114 are arranged to establish a conjugate relationship between the photosensitive cell 142 and the focal plane of the taking lens 89. The brightness on the photosensitive cell 142 is dependent solely on the aperture of the taking lens. In other words, the light beam travelling through the taking lens aperture to the photosensitive cell 142 is not disturbed by the condenser lenses 113 and 144 disposed in the optical path. A ring 145 is further provided on the body for rotation about the optic axis so as to retract the mirror 111 after completion of the aperture control. The ring 145 is biased for clockwise rotation by a spring 146 and in the tight or completely biased position, a projection 145a thereof is retained by the release lever 129. Another projection 145b of the ring 145 is engageable with the projection 60b of the aperture control ring 60, and the cam portions 145c and 145d formed in the ring 145 are engageable with a pin 148 studded on a switch changeover lever 147. In FIG. 8, pin 78 on the stop vane 76 is received in a hole formed in the lens tube 73 so as to limit the rotation of the stop ring 75 with the aid of a lever 149 cooperable with cams 79c and 79d formed in the aperture adjust ring 79 for manually setting the f-value. When the aperture adjust ring 79 is rotated until letter A of the scale 86 thereon is registered with the reference mark 87, a pin 150 on one end of lever 149 is urged against the cam portion 79c by spring 151 and the other end of the lever 149 is retracted from the path of movement of a pin 152 on the stop ring 75; so as to prevent the pin 152 from being retained by the lever 149 even when the stop ring 75 is rotated for a minimum aperture. However, when the aperture is manually set, that is, when numerals of the scale 86 instead of the letter A are registered with the reference mark 87, the pin 150 cooperates with the cam portion 79d to rotate the lever 149 clockwise in accordance with the set value of the aperture and to move the other end of the lever 149 into the movement path of the pin 152. Therefore, rotation of the stop ring 75 causes the pin 152 to be retained by the lever 149 to thereby determine the diameter of the aperture. The pin 83 studded on the aperture adjust ring 79, when rotated clockwise for mounting a lens to the camera, is engageable with a projection 154a of an interlocking ring 154 provided on the body and biased for counter-clockwise rotation about the optic axis by spring 153, thereby rotating the ring 154 against the force of the spring 153 in accordance with the set f-value. The inner side wall of the ring 154 is formed with two cam portions, one of which provides cam surfaces 154b and 154c cooperable with a pin 156 formed on a bell crank lever 155. The cam surface 154b, being in an arcuate form concentric with the optic axis, corresponds to the range from the position for the automatic aperture control to the set position for minimum f-value (i.e., from division A to 2 on the scale), and the cam surface 154c corresponds to the succeeding range. Thus, the bell crank lever 155 remains stationary for the range from A to 2, but is rotatable counter-clockwise as the ring 79 is rotated onward from division 2.

At one end of the lever 155 there is secured a string or flexible wire 157, which extends therefrom via a pulley 158 to a pulley 159 secured integrally to the rotatable indicator 109. The indicator 109 is biased for clockwise rotation by a spring 160. A pointer 161 provided in the indicator is adapted to move in the viewfinder's optical path and cooperates with an aperture scale 162 or with an exposure time scale 163. The scales 162 and 163 are respectively mounted on slide plates 165 and 166 which are slidable by a see-saw lever 164 in opposite directions to each other. A spring 167 is provided to bias the aperture scale 162 rightwardly (as viewed in FIG. 8) and the exposure time scale 163 leftwardly. When the aperture adjust ring 79 is set to the letter A, a pin 169 on the ring 154 pushes the downwardly extending portion 166a of the slide plate 166 so as to retract the exposure time scale 163 out of the viewfinder's optical path and position the aperture scale 162 in such optical path. Where the shutter exposure time is set with a predetermined f-value, the aperture adjust ring 79 is rotated until the division of the aperture scale representing the predetermined f-value is registered with the reference mark 87, whereby the ring 154 is rotated counter-clockwise so as to disengage the pin 169 from the downwardly extending portion 166a so that the slide plate 166 is moved leftwardly by the action of spring 167 until stopped by pin 168. This causes the aperture scale 152 to retract and the exposure time scale 163 to be positioned in the viewfinder's optical path. At the same time, the portion 170 laterally extending from the downwardly extending portion 166a actuates the switch 95 to close at contact x.

Although the other of said two cam portions formed in the inner side wall of the interlocking ring 154 is not shown, the unshown cam portion is engageable with a pin 171 provided on the ratchet pawl 62 so that the pawl 62 is allowed to rotate counter-clockwise upon deenergization of the electromagnet 65 only when the aperture adjust ring 79 is set to the position A, but in other cases, the pawl 62 is prevented from rotating by the unshown cam portion which then engages a pin 171 from outside thereof.

A pin 172 provided on the ring 145 is cooperable with the projection 118a of the return lever 118 to return the ring 145 from its operative position to its tight or completely biased position when the return lever 118 is rotated counter-clockwise by the action of spring 121. The projection 145e of the ring 145 serves to strike one end 127a of the release lever 127 and thereby release the mirror driving mechanism. This action will be described hereunder.

When the wind lever 1 is rotated counter-clockwise, the shutter is tightened in the described sequence. The mirror driving mechanism rotates the return lever 118 clockwise through lever 122 upon reciprocal rotation of cam 125 until the lever 118 is stopped by the key lever 126. Thereupon, springs 120 and 121 become tensioned.

Automatic Aperture Control with a Preset Shutter Speed

As shown in FIG. 8, a desired division of the exposure time scale on the shutter dial is registered with the reference mark 107. The letter A on the aperture adjust ring 79 is registered with the reference mark 87. In this case, the aperture scale 162 appears in the viewfinder's optical path and the pointer 161 indicates an f-value to which the lens aperture is to be automatically controlled. The pin 150 on the lever 149 is engaged with the cam portion 79c of the aperture adjust ring 79 so that the ring 75 is freely rotatable.

When the release rod 15 is depressed the release lever 129 swings counter-clockwise to rotate the rings 145, 60 and 75 so that the aperture provided by the stop vane 76 is gradually reduced. Accordingly, the brightness on the photosensitive cell 142 is gradually reduced to a value corresponding to the preset shutter speed, whereupon the electromagnet 65 loses its attaction to allow the ratchet pawl 62 to retain the ratchet 60a, thereby preventing any further rotation of control ring 60 and stop ring 75. Thus, an f-value is determined. The ring 145 continues to rotate so that the cam portion 145d thereof raises the pin 148 to rotate the lever 147 counter-clockwise to thereby cause the pin 173 to open the switch 90 for memorizing the intensity of light passed through the stopped-down taking lens, and at the same time the switch 95 is changed-over from contact y to contact x. Simultaneously therewith or immediately thereafter, the projection 145e strikes the key lever portion 127a to release the mirror driving mechanism. By the action of the spring 120 the kick-up lever 117 is rotated clockwise to push the pin 136, so that the mirror 11 is rotated about shaft 116 to retract out of the optical path. At the end of this process, the pin 137 on the lever 117 strikes the lever portion 138a to rotate the lever 138 counter-clockwise, so that the lever portion 138b pushes the pin 109 to rotate the shutter release lever 44 counter-clockwise and thus the shutter is released. Thereupon, the pin 174 on the lever 44 opens a switch 175 (not shown in FIGS. 5 and 6) which is connected in series with the switch 95 and normally closed to short-circuit the capacitor C, which thus begins to be charged. The shutter exposure time is controlled in accordance with the intensity of light memorized due to the described circuit principle, which intensity of light is based on a predetermined exposure time and after all controlled by such exposure time. Control of the aperture is effected in sequence by the step-by-step retention of the ratchet 60a and therefore the value of the aperture itself cannot be controlled to a higher precision than allowed by these steps. However, any error which might arise from such step-by-step control can be absorbed in the exposure time because the exposure time is controlled in accordance with the memorized intensity of light passed through the actually stopped-down taking lens. Also when the object to be photographed is so excessively bright that a proper exposure cannot be provided even by a minimum aperture, the error is fed back to the shutter control to automatically correct the exposure time. This is also the case with too dark an object.

When the capacitor C is charged up to a voltage corresponding to the memorized intensity of light, the electromagnet 50 loses its attraction to allow the second vane 24 to close the film exposure opening. At the end of this process, the end 26a of the lever 26 strikes the end 126a of the key lever 126 to thereby release the return lever 118. By the action of the spring 121 the lever 118 is rotated counter-clockwise to push the pin 140, which in turn rotates the kick-up lever 117 counter-clockwise, and at the same time the projection 118a of the lever 118 pushes the pin 172 to rotate the ring 145 counter-clockwise. As the result, the mirror 111 is returned into the optical path of the taking lens by the force of the spring 141 and the stop ring 75 is returned to the shown position with the stop vane 76 fully open.

Automatic Shutter Speed Control with a Preset f-value

The aperture adjust ring 75 is rotated until a desired f-value is registered with the reference mark 87. In this case, as described already, the aperture scale 162 is retracted from the finder's field of view and the exposure scale 163 appears there. The switch 95 is closed at contact x by leftward movement of the portion 170. The ratchet pawl 62 is immovable because the pin 171 is retained by the unshown cam formed in the inner side wall of the ring 154. The other end of the stop retaining lever 149 is moved into the movement path of the pin 152 on the ring 75 with the pin 150 in engagement with the cam portion 79d of the ring 79. The lever 155 is rotated counter-clockwise in accordance with the position of the cam portion 154c engaged by the pin 156, that is, in accordance with the preset f-value, thereby changing the position of the pointer 161. The pointer 161 indicates the exposure time to be controlled.

When the release rod 15 is depressed, rings 145, 60 and 75 are all rotated clockwise and the ring 75 alone is stopped by the engagement of the pin 152 with the lever 149. By that time, the stop vane 76 has assumed a preset f-value. On the other hand, the ring 145 continues to rotate and causes the cam 145d thereof to open the switch 90 for memorizing the intensity of light passed through the stopped-down photographing lens. The switch 95 is previously closed at contact x and remains in that position. Subsequently the projection 145e strikes the key lever 127a to thereby release the mirror driving mechanism. Thereafter, the shutter exposure time is controlled in accordance with the memorized intensity of light in the described manner.

Thus, it will be appreciated from the above that according to the present invention, it is possible to preset a shutter exposure time and automatically control the f-value in accordance with the preset exposure time as well as to preset an f-value and automatically control the shutter exposure time, and this leads to great versatility in use. Particularly in the former mode of operation, the preset exposure time may be automatically corrected if the object is so bright or so dark that a proper exposure cannot be attained even by using a limit f-value, and this means that a proper exposure can be achieved for objects in a very wide range of brightness.

What is claimed is:

1. In a camera having a taking lens with an adjustable aperture and shutter means mounted for movement from an initial position to a terminal position, and constructed and arranged that the time period between initiation and termination of movement is determinative of the exposure time of said camera, an automatic exposure system comprising:
    a. photosensitive means responsive to the light which is passed through said taking lens for providing a first electric signal related to the brightness of said light,
    b. memory means coupled to said photosensitive means for memorizing the value of brightness of the light passed through said taking lens after adjustment of said aperture,
    c. selectively actuable control means for adjusting the size of said aperture in response to said first electric signal and a predetermined exposure time,
    d. selectively actuable control means for adjusting the exposure time of said shutter means in response to the value of light memorized by said memory means, and
    e. switch means for selectively actuating either said control means for adjusting the size of said aperture or said control means for adjusting the exposure time of said camera.

2. A camera according to claim 1, wherein said control means for adjusting the size of said aperture includes aperture adjust means, means for moving said aperture adjust means from an initial position to a terminal position, said aperture adjust mean being constructed and arranged that the distance of movement from said initial position is determinative of the aperture opening of said taking lens, means for releasably retaining said aperture adjust means in said initial position, release means for releasing and initiating movement of said aperture adjustment means from said initial position to said terminal position, and stop means for stopping the movement of said aperture adjust means in response to said first electrical signal and said exposure time.

3. A camera according to claim 1, wherein said shutter means includes at least two elements mounted for movement from an initial to a terminal position, and so constructed and arranged that the time period between initiation and termination of movement of said elements is determinative of the exposure time, and said control means for adjusting the exposure time of said shutter means includes means for releasably retaining said elements in said initial position, release means for releasing and initiating movement of some of said elements away from said initial position towards the terminal position, and means for adjusting the period between initiation and termination of movement of other of said elements.

4. In a camera having a taking lens with an adjustable aperture, an automatic exposure system comprising:
   a. photosensitive means responsive to the light which is passed through said taking lens for providing a first electric signal related to the brightness of said light,
   b. aperture adjust means for adjusting the size of said aperture,
   c. selectively actuable control means for controlling said aperture adjust means in response to said first electric signal and a predetermined photographic condition,
   d. memory means coupled to said photosensitive means for memorizing the value of the brightness of the light passed through said taking lens after adjustment of said aperture,
   e. shutter means mounted for movement from an initial position to a terminal position, and constructed and arranged that the time period between initiation and termination of movement is determinative of the exposure time of said camera,
   f. release means for initiating movement of said shutter means from said initial position after adjustment of said aperture of the taking lens,
   g. timing circuit means for providing a second electric signal related to a time interval beginning with the initiation of movement of said shutter means from said initial position, and
   h. shutter speed control means responsive to the value of light memorized by said memory means and said second electrical signal of said timing circuit for adjusting time period between initiation and termination of movement of said shutter means whereby the exposure time of said camera is determined,
   i. switch means for selectively actuating either said control means for adjusting the size of said aperture or said control means for adjusting the exposure time of said camera.

5. A camera according to claim 4, wherein said predetermined photographic condition relates to a predetermined exposure time of said shutter means.

6. A camera according to claim 4, wherein said predetermined photographic condition relates to both a predetermined exposure time of said shutter means and a predetermined film speed.

7. A camera according to claim 4, wherein said photosensitive means is mounted on said shutter means.

8. A camera according to claim 4, further comprising a single lens reflex optical viewing system and wherein said photosensitive means is mounted in said optical viewing system.

9. A camera according to claim 4, wherein said aperture adjust means includes selectively actuable manual control means for allowing manual presetting of the size of said aperture and first mechanical switch means selectively actuating either said automatic control means for controlling said aperture adjust means or said manual control means for allowing manual presetting of said aperture.

10. A camera according to claim 9, including indicating means responsive to both said first mechanical switch means and said automatic control means for controlling said aperture adjust means for indicating the adjusted size of said aperture, and second indicator means responsive to said first mechanical switch means and said manual control means for allowing manual presetting of said aperture for indicating the adjusted exposure time of said shutter means.

11. A camera according to claim 4, wherein said automatic control means includes means for moving said aperture adjust means from an initial position to a terminal position, said aperture adjust mean being constructed and arranged that the distance of movement from said initial position is determinative of the aperture opening of said taking lens, means for releasably retaining said aperture adjust means in said initial position, means responsive to said release means for releasing and initiating movement of said aperture adjustment means from said initial position to said terminal position, and stop means for stopping the movement of said aperture adjust means in response to said first electrical signal and said predetermined photographic condition.

12. A camera according to claim 4, wherein said memory means includes electric storage means coupled to said photosensitive means through first electric switch means and responsive to said first electric signal, said electric switch means being responsive to said release means for decoupling said electric storage means from said photosensitive means.

13. A camera according to claim 4, wherein said shutter means includes at least two elements mounted for movement from an initial to a terminal position, and so constructed and arranged that the time period between initiation and termination of movement of said elements is determinative of the exposure time, and said control means for adjusting the exposure time of said shutter means includes means for releasably retaining said elements in said initial position, means responsive to said release means for releasing and initiating movement of some of said elements away from said initial position towards the terminal position, and means connecting other of said elements to said shutter speed control means to adjust the period between initiation and termination of movement of said other elements.

14. A camera according to claim 13, wherein said timing circuit means includes charging means responsive to said release means for providing said second signal related to a time interval beginning with the movement of said elements from the initial position.

15. In a camera having a taking lens, an automatic control system comprising:
   a. photosensitive means responsive to the light which is passed through said taking lens for providing a first electric signal relating to the brightness of said light,
   b. aperture adjust means for adjusting the size of said aperture,
   c. selectively actuable automatic control means for controlling said aperture adjust means,
   d. shutter means adjacent said taking lens and mounted for movement from an initial position to a terminal position, and constructed and arranged that the time period between initiation and termination of said movement is determinative of the exposure time of said camera,
   e. selectively actuable shutter speed control means for adjusting the time period between initiation and termination of movement of said shutter means between said initial and terminal positions,
   f. timing circuit means including means for producing an output signal either of a second electrical signal related to a predetermined exposure time or of a third electrical signal related to a time interval beginning with the initiation of movement of said shutter means,
   g. memory means coupled to said photosensitive means for memorizing and producing a fourth electrical signal related to the value of the brightness of the light passing through said taking lens,
   h. first combining circuit means responsive to said fourth electrical signal and said output of said timing circuit for producing an actuating output,
   i. means responsive to said actuating output for selectively controlling said automatic control means and said shutter speed control means,
   j. sequential switch means for selectively actuating said automatic control means for controlling said aperture adjust means while selectively actuating said timing circuit to produce said second electrical signal at its output, and then selectively actuating said shutter speed control means while selectively actuating said timing circuit to produce said third electrical signal at its output,
   k. manual means for selectively adjusting said aperture adjust means,
   l. means responsive to said manual means, for disabling said automatic control means for controlling said aperture adjust means, and
   m. release means for actuating said switch means.

16. A camera as in claim 15, further comprising means providing a fifth electrical signal related to film sensitivity, and second combining circuit means responsive to said fourth electrical signal and said fifth electrical signal and having its output coupled to said first combining circuit.

17. A camera according to claim 15, wherein said photosensitive means is mounted on said shutter means.

18. A camera according to claim 15, further comprising a single lens reflex optical viewing system and wherein said photosensitive means is mounted in said optical viewing system.

19. A camera according to claim 15, wherein said automatic control means includes means for moving said aperture adjust means from an initial position to a terminal position, said aperture adjust means being constructed and arranged that the distance of movement from said initial position is determinative of the aperture opening of said taking lens, means for releasably retaining said aperture adjust means in said initial position, means responsive to said release means for releasing and initiating movement of said aperture adjustment means from said initial position to said terminal position, and stop means for stopping the movement of said aperture adjust means in response to said first electrical signal.

20. A camera according to claim 15, wherein said shutter means includes at least two elements mounted for movement from an initial to a terminal position, and so constructed and arranged that the time period between initiation and termination of movement of said elements is determinative of the exposure time, means for releasably retaining said elements in said initial position, means responsive to said release means releasing and initiating movement of some of said elements away from said initial position towards the terminal position, and means connecting other of said elements to said shutter speed control means to adjust the period between initiation and termination of movement of said other elements.

21. A camera according to claim 4, wherein said
   memory means includes means for producing a memory signal corresponding to said memorized value, and further comprising
   first means for producing a signal corresponding to said predetermined photographic condition; and
   comparison means connectable selectively to said first means and said photosensitive means for comparing said first electrical signal with said predetermined photographic condition signal, and to said memory means and said timing circuit means for comparing said second electrical signal with said memory signal, said comparison means producing a first output to control said aperture adjust means when the difference between said first electrical signal and said predetermined photographic condition signal reaches a predetermined level, and producing a second output to move said shutter means to said terminal position when the difference between said second electrical signal and said memory signal reaches a predetermined value.

22. A camera according to claim 21, wherein said aperture adjust means includes selectively actuable manual control means for allowing manual presetting of the size of said aperture and first mechanical switch means selectively actuating either said automatic control means for controlling said aperture adjust means or said manual control means for allowing manual presetting of said aperture.

23. A camera according to claim 22, further comprising change-over switch means for connecting selectively said comparison means to said first means and said photosensitive means or to said timing circuit means and said memory means, said change-over switch means, when said automatic control means is actuated by said first mechanical switch means, being adapted to connect said comparison means to said first means and said photosensitive means to thereby automatically adjust the aperture size, and then to connect said comparison means to said timing circuit means and said memory means to thereby adjust the exposure time in response to the value of light memorized by said memory means.

24. A camera according to claim 23, wherein said change-over switch means is adapted to connect said comparison mean to said timing circuit means and said memory means when said manual control means is actuated by said first switching means.

* * * * *

UNITED STATES PATENT OFFICE
CERTIFICATE OF CORRECTION

Patent No. 3,829,867          Dated August 13, 1974

Inventor(s) SHIGEO ONO

It is certified that error appears in the above-identified patent and that said Letters Patent are hereby corrected as shown below:

Column 5, line 5, "clock" should read --click--;

Column 8, line 25, "where $_3$" should read --where $i_3$--;

Column 8, line 28, "$t_3$" should read --$i_3$--;

Column 8, line 42, (formula 16) the sign " = " (second occurrence) should read -- + --;

Column 8, line 45 (formula 17) insert -- exp -- after "$(C/I_o)$";

Column 8, line 48, (formula 18) delete "$(v_{o2}/h)$" and insert -- $(- v_{o2}/h)$ --;

Column 8, line 52 (formula 19) delete "$v_c$" and insert -- $v_c/h$ --;

Column 8, line 57 (formula 20) delete "$(V_{o2}/h)$" and insert -- $(- V_{o2}/h)$ --;

Column 8, line 62, the formula designation "(21)" should be spaced to the far right of the line and the characters should be of reduced size.

UNITED STATES PATENT OFFICE
CERTIFICATE OF CORRECTION

Patent No. 3,829,867    Dated August 13, 1974

Inventor(s) SHIGEO ONO    Page - 2

It is certified that error appears in the above-identified patent and that said Letters Patent are hereby corrected as shown below:

Column 9, line 38, "SLt = constant tm (27)" should read

--SLt = constant    (27)--;

Column 9, line 62, "provied" should read --provided--;

Column 10, line 25, "downward" should read --downwardly--;

Column 10, line 66, "fof" should read --of--;

Column 11, line 24, "thd" should read --the--;

Column 11, line 53, "directely" should read --directly--;

Column 12, line 5, "brighness" should read --brightness--;

Column 12, line 11, "counterClockwise" should read --counter-clockwise--;

Column 12, line 58, "vlue" should read --value--;

Column 12, line 59, "os" should read --is--;

Column 13, line 43, "not" should read --now--;

Column 13, line 45, "trnsistors" should read --transistors--;

Column 13, line 66, "transisotr" should read --transistor--;

Column 15, line 2, "so" should read --50--;

UNITED STATES PATENT OFFICE
CERTIFICATE OF CORRECTION

Patent No. 3,829,867      Dated August 13, 1974

Inventor(s) SHIGEO ONO      Page - 3

It is certified that error appears in the above-identified patent and that said Letters Patent are hereby corrected as shown below:

Column 15, line 33, "bdtween" should read --between--;

Column 15, line 64, "releae" should read --release--;

Column 18, line 16, "152" should read --162--;

Signed and sealed this 31st day of December 1974.

(SEAL)
Attest:

McCOY M. GIBSON JR.
Attesting Officer

C. MARSHALL DANN
Commissioner of Patents